United States Patent [19]

Wong et al.

[11] Patent Number: 5,224,019
[45] Date of Patent: Jun. 29, 1993

[54] MODULAR COMPUTER ASSEMBLY

[75] Inventors: Albert C. Wong, Laguna Hills, Calif.; Robert D. Kutnick, Sharon, Mass.

[73] Assignee: Amkly Systems, Inc., Irvine, Calif.

[21] Appl. No.: 818,031

[22] Filed: Jan. 8, 1992

Related U.S. Application Data

[63] Continuation of Ser. No. 670,026, Mar. 15, 1991.

[51] Int. Cl.$^5$ .............................................. H05K 7/00
[52] U.S. Cl. ..................... 361/393; 361/394; 361/391; 361/399; 361/413; 361/415; 364/708; 439/59; 439/61; 439/64; 439/74
[58] Field of Search ............... 361/380, 392, 393, 394, 361/390, 399, 391, 413, 415; 439/59, 61, 64, 74; 364/708

[56]  References Cited

U.S. PATENT DOCUMENTS 4,971,563  11/1990  Wells, III .............................. 439/61
4,979,075  12/1990  Murphy ................................ 361/399

OTHER PUBLICATIONS

5 Sheets of "Ergo The Company" brochure.

Primary Examiner—Leo P. Picard
Assistant Examiner—Young S. Whang
Attorney, Agent, or Firm—Stetina and Brunda

[57]  ABSTRACT

A modular computer chassis comprises a main chassis to which a motherboard is attached and a subchassis attachable to the main chassis. The subchassis is capable of having at least one computer component attached thereto such that the computer component is electrically connected to the motherboard. The computer component is thus separable from the main chassis by removing the subchassis from the main chassis. The subchassis contains those computer components subject to mechanical wear and most often requiring replacement, i.e. the power supply and disk drives. The subchassis is mechanically connected to the main chassis by using slots and tabs such that when the cover is in place upon the computer, then the subchassis is secured therein. The subchassis and the computer components disposed thereon thus form a module which is conveniently removable and replaceable such that those computer components most frequently requiring service is quickly removed and replaced by a person unskilled in computer repair.

8 Claims, 4 Drawing Sheets

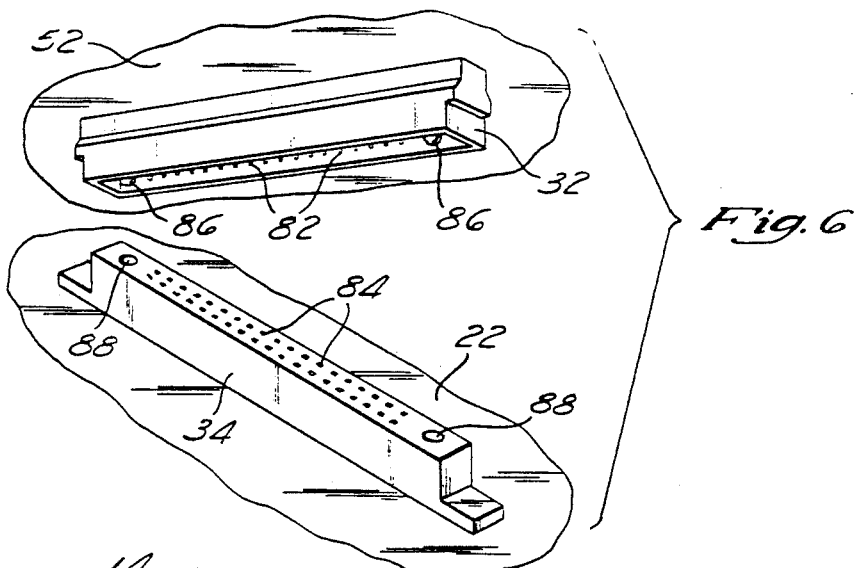
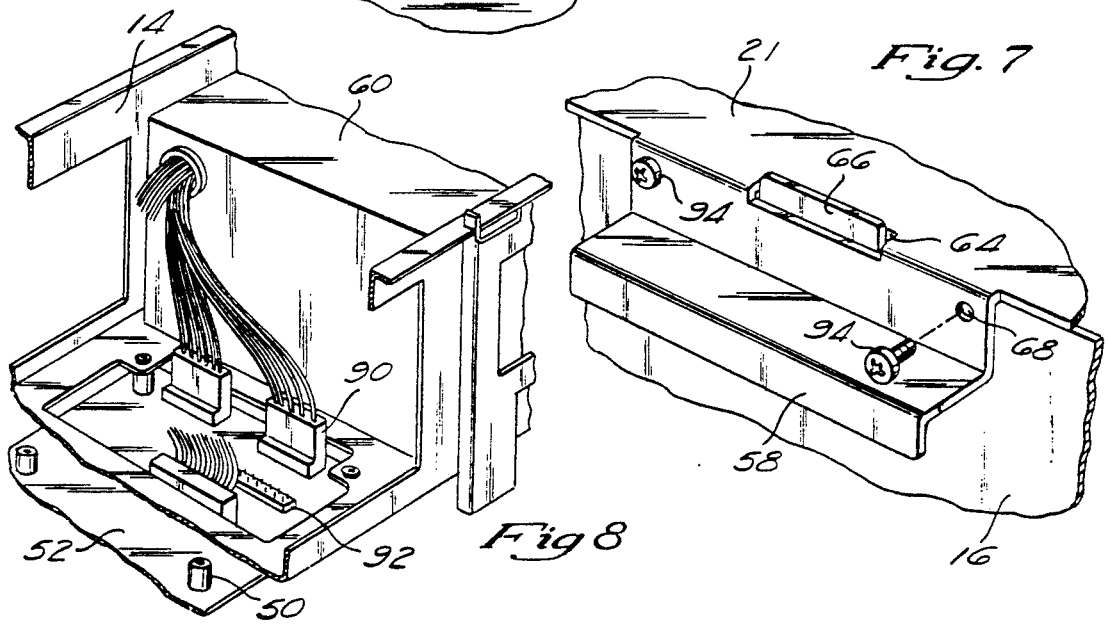
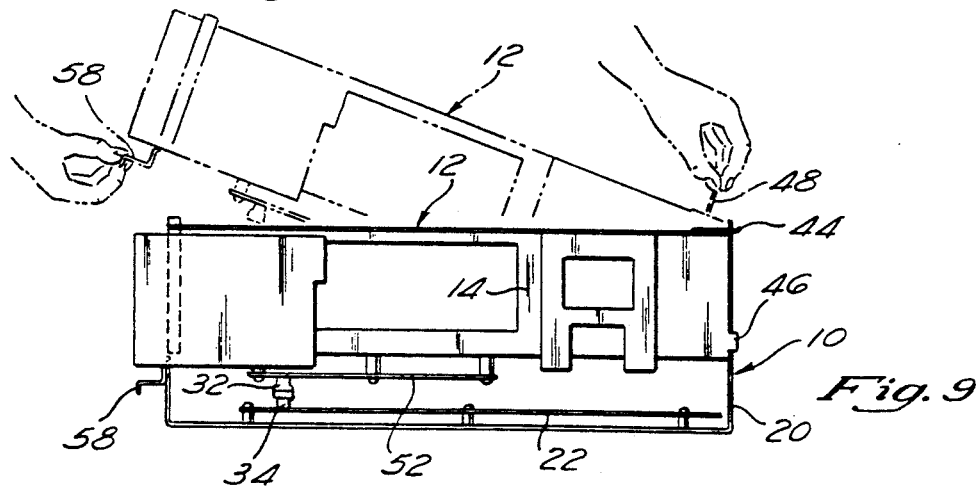

MODULAR COMPUTER ASSEMBLY

This application is a continuation of application Ser. No. 07/670,026, filed Mar. 15, 1991.

FIELD OF THE INVENTION

The present invention relates generally to computers and more particularly to a modular computer chassis for facilitating the convenient removal and replacement of those computer components primarily subject to mechanical wear.

BACKGROUND OF THE INVENTION

Personal computers for executing applications programs such as word processors, databases, and spreadsheets are well-known. Such general purpose microcomputers run a wide variety of programs and may be adapted to perform many different tasks. Memory size and speed have evolved to the point where modern microcomputers rival mainframes in performance.

Such personal or microcomputers are commonly constructed to have a motherboard disposed parallel to and adjacent the lower surface of a chassis and to have various cards, i.e. graphics adaptor, disk drive controller, modem, add-on memory, etc., disposed above and perpendicular thereto. These add-on cards are typically attached to the motherboard via card edge connectors. A power supply is generally located at the rear of the chassis such that cooling air may be drawn into the chassis therethrough and then circulated among the computer components. Floppy disk drives are typically disposed at the front of the chassis to provide convenient access to the user such that diskettes may be readily inserted therein. Although access is not required, hard disk drives are commonly located in the same manner because of their similar mounting requirements. The entire assembly is commonly contained within a stamped sheet metal chassis and covered with a metal and/or plastic enclosure or cover.

The most common items of such computers that require maintenance and/or replacement are those having moving parts which are necessarily subject to mechanical wear. These computer components include the floppy and hard disk drives, as well as the power supply which contains a fan. Although problems are often easily isolated to a specific one of these components, removal of the malfunctioning component involves the removal of mounting hardware, i.e. fasteners or screws, and the disconnection of electrical connectors. Installation of a new or repaired computer component consequently involves replacement of the mounting hardware and reconnection of the electrical connectors.

Removal of the mounting hardware typically requires loosening or removal of several fasteners or screws and the manipulation of the affected component to separate it from the chassis. Hand tools, i.e. a screwdriver and nutdriver, are typically required to effect removal of the mounting hardware.

The new or repaired computer component must be manipulated into place within the chassis. It must be aligned properly in order to be installed correctly. Misalignment of the component typically results in an inability to properly re-install the mounting hardware as often evidenced by misaligned screw holes. Reconnection of the electrical connectors is commonly complicated by the limited space available for the manipulation thereof.

The disconnection and reconnection of electrical connectors presents particular problems in that such connectors are often difficult to disconnect, must be aligned properly prior to reconnection, and are often difficult to reconnect. It is crucial that the disconnection, alignment, and reconnection processes be performed correctly to avoid damage to the connector as well as to nearby computer components. Additionally, it is extremely important that connections be made among the proper connectors. It is often possible to make connection between the wrong connectors, thus possibly resulting in damage to the computer. One example of this is the bus connectors from the power supply of the IBM PC, XT and compatibles. It is often possible to reverse the position of two of the power supply connectors, i.e. P8 and P9 relative to the bus connector mounted to the motherboard.

Electrical connectors are frequently difficult to disconnect because of their awkward positioning within the computer and because of the detent mechanisms utilized to prevent their inadvertent disconnection. Tools, most commonly screwdrivers, are often used to facilitate disconnection of obstinate connectors. The use of such tools may increase the potential for causing damage to the computer since the tool is often used to pry or push components and is subject to slippage during use. Further, many surfaces within the computer are not suitable for use as a fulcrum and are subject to damage when so used. For example, it is not uncommon for a portion of a disk drive to be used as a fulcrum when prying the disk drive connector therefrom. Such use may potentially cause damage to the drive. Damage to various other components could likewise occur if the user should slip while attempting to pry the connector.

It is absolutely essential that the connectors be properly aligned prior to attempting their reconnection. It is not uncommon for one connector to be reversed or turned over when reconnection is attempted by an inexperienced person. Such an attempt at reconnection of a misaligned connector will likely result in damage thereto. Indeed, if the misaligned connector were forced to reconnect, mechanical and/or electrical damage to the computer would be likely.

As can be appreciated, some degree of mechanical ability is therefore required for the removal and replacement of those computer components which are most likely to fail. Thus, there exists in the art a substantial need for a means for conveniently removing and replacing those components subject to mechanical wear. The means should minimize the amount of skill required as well as the probability of causing damage to the computer during the process It should also substantially reduce the amount of time required to remove and replace these components. As such, although the prior art has recognized to a limited extent the problem of moving and replacing computer components, the proposed solutions have to date been ineffective in providing a satisfactory remedy.

SUMMARY OF THE INVENTION

The present invention specifically addresses and alleviates the above mentioned deficiencies associated in the prior art. More particularly, the present invention discloses a modular computer chassis comprising a main chassis to which a motherboard may be attached and a subchassis attachable to the main chassis. The subchassis is capable of having at least one computer component attached thereto such that the computer component is electrically connected to the motherboard. The computer component may thus be separated from the main chassis by removing the subchassis from the main chassis.

Complimentary electrical connectors attached to the subchassis and the main chassis automatically provide electrical interconnection therebetween when the subchassis is attached to the main chassis. The subchassis will preferably contain those computer components subject to mechanical wear and most often requiring replacement, i.e. the power supply, disk drives and/or tape drives. The subchassis is mechanically connected to the main chassis by using slots and tabs such that when the cover is in place upon the computer, the subchassis is secured therein.

The subchassis and the computer components disposed thereon thus form a module or peripheral tray which may be conveniently removed and replaced such that those computer components most frequently requiring service may be quickly removed and replaced by a person unskilled in computer repair. The modular chassis of the present invention eliminates the need to manipulate connectors or individual computer components, thus substantially reducing the likelihood of inadvertently damaging the computer.

Additionally, by attaching a hard disk to the subchassis, the module or peripheral tray may be used to transfer data between like constructed computers. Thus, the hard disks may be interchanged among computers having the modular chassis of the present invention.

By facilitating such data transfer, the present invention makes it possible for a user to begin a project on a first computer, transfer data to a second computer, and resume working on the second computer while having full access to the data so transferred. For example, a user may wish to continue a computer project commenced at work after arriving at home in the evening. The user would simply remove the module or peripheral tray from the computer at work, carry the module home, and there install the module on another computer. Thus, quantities of data too large to be conveniently transported via diskette can be easily transferred among computers.

These, as well as other advantages of the present invention will be more apparent from the following description and drawings. It is understood that changes in the specific structure shown and described may be within the scope of the claims without departing from the spirit of the invention.

BRIEF DESCRIPTION OF THE DRAWINGS

FIG. 6 is a perspective view of the male and female connectors for electrically connecting the subchassis to the main chassis;

FIG. 7 is an enlarged perspective view of the front tab of the main chassis and the front slot of the subchassis showing engagement thereof;

FIG. 8 is a sectional view of the subchassis showing the electrical distribution board;

FIG. 9 is a side elevation view of the modular computer chassis of the present invention illustrating detachment of the subchassis from the main chassis.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and/or sequence of steps for constructing and operating the invention in connection with the illustrated embodiment. It is to be understood, however, that the same or equivalent functions and sequences may be accomplished by different embodiments and are also intended to be encompassed within the spirit and scope of the invention.

Figure 1:
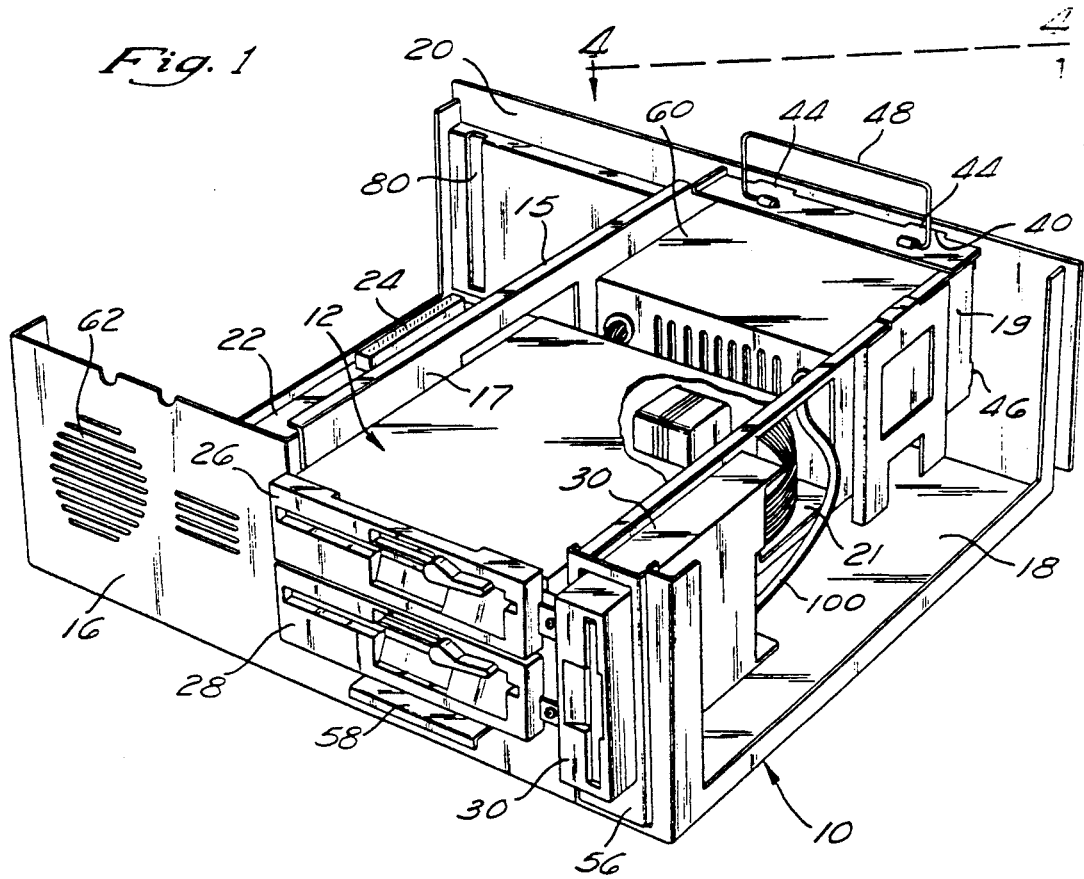
FIG. 1 is a perspective view of the modular computer chassis of the present invention having a motherboard attached to the main chassis and having two conventional 5¼-inch floppy diskette drives, one conventional 3½-inch mini-floppy drive and a power supply attached to the subchassis.
Figure 2:
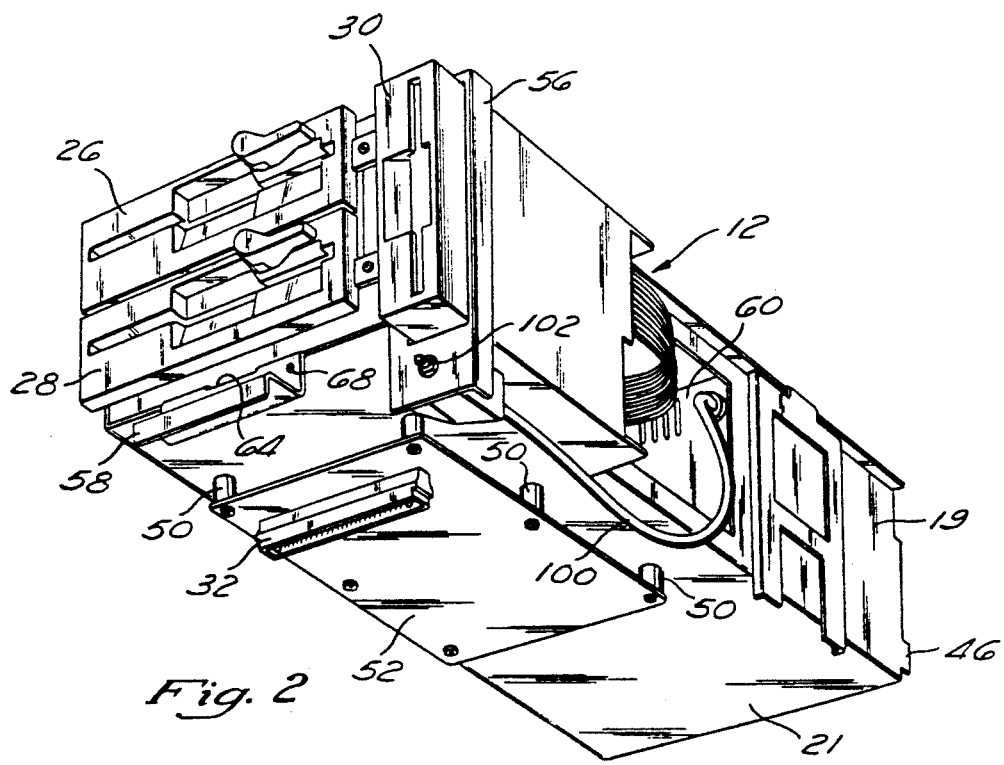
FIG. 2 is a perspective view of the subchassis and computer components attached thereto of FIG. 1 showing the underside thereof.
Figure 3:
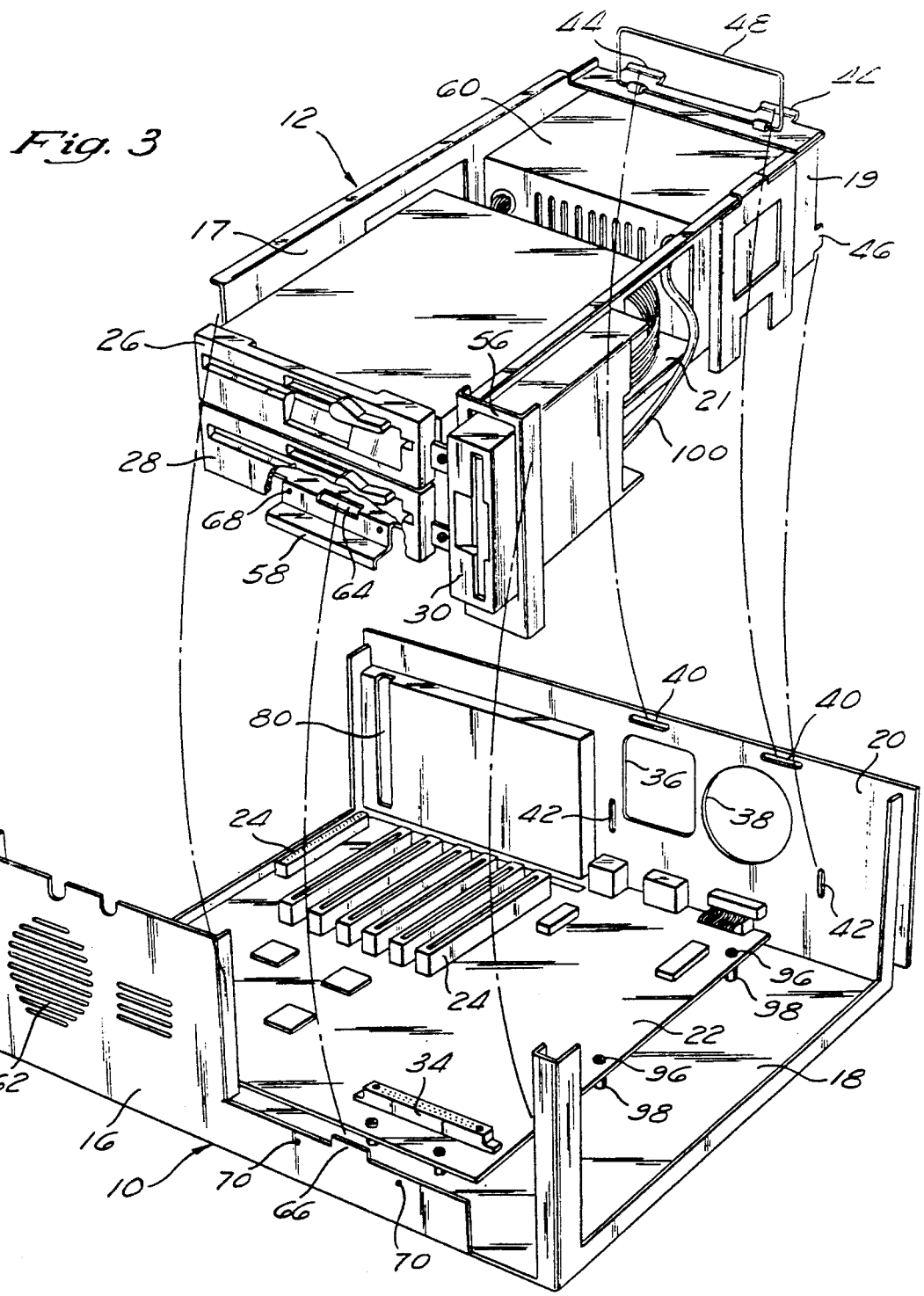
FIG. 3 is an exploded perspective view of the chassis and subchassis of FIG. 1.

The modular chassis of the present invention is illustrated in FIGS. 1-9 which illustrate a presently preferred embodiment of the present invention. Referring more particularly to FIGS. 1-3, the modular chassis is generally comprised of a main chassis 10 and a subchassis 12 which is attachable to the main chassis 10. In the preferred embodiment of the present invention the main chassis 10 is configured such that a computer motherboard 22 may be attached thereto and the subchassis 12 is configured such that at least one computer component may be attached thereto. The computer components attached to the subchassis 12 are preferably those components subject to mechanical wear, i.e. the power supply, disk drives and/or tape drives. The computer components 26, 28, 30, and 60 attached to the subchassis 12 are automatically electrically connected to the motherboard 22 when the subchassis 12 is attached to the main chassis 10. The subchassis 12 and the computer components 26, 28, 30, and 60 attached thereto define a module or peripheral tray which may be removed from the main chassis 10 for maintenance purposes or to facilitate the transfer of data to another, like computer. Data may be transferred when a hard disk is attached to the subchassis 12.

The main chassis 10 comprises a front panel 16, a bottom 18, and a rear panel 20. The motherboard 22 may be attached to the bottom panel 18 via fasteners or screws 96 and standoffs 98.

The main chassis 10 further comprises a plurality of slots 80, a fan aperture 38, and an electrical access aperture 36 as is common in the art. A speaker grill 62 is formed in the front panel 16.

The subchassis 12 is comprised of left 17 and right 19 panels and a bottom 21. A bracket 56 may optionally be attached to the subchassis 12 such that a 3½-inch diskette drive or tape drive may be attached to the subchassis 12.

A first or male electrical connector 32 (shown in FIG. 2) disposed upon the bottom of the subchassis 12 mates with a complimentary second or female electrical connector 34 (shown in FIG. 3) disposed upon the motherboard 22 as the subchassis 12 is being attached to the main chassis 10. Thus, electrical interconnection is provided between the motherboard 22 and the electrical components 26, 28, 30, and 60 disposed upon the subchassis 12.

In the preferred embodiment of the present invention an electrical distribution board 52 (shown in FIG. 2) is attached via standoffs 50 to the lower surface 21 of the subchassis 12. The electrical distribution board 52 provides a common connection point for the power and signal conductors from the computer components 26, 28, 30, and 60 for connection to the male electrical connector 32. The electrical distribution board 52 has connectors 92 (shown in FIG. 8) disposed on the upper surface thereof which facilitate electrical connection of the computer components 26, 28, 30, and 60 thereto. The electrical distribution board 52 preferably comprises a printed circuit board having traces for providing electrical interconnection between the electrical connectors 92 disposed upon the upper surface thereof and the male electrical connector 32 disposed upon the lower surface thereof. Those skilled in the art will recognize that various means are suitable for electrically interconnecting the electrical connectors 92 and the male electrical connector 32.

Both the main chassis 10 and subchassis 12 are preferably constructed of sheet metal, preferably aluminum. Thus, the main chassis 10 and subchassis 12 may be formed by stamping or a similar process. Those skilled in the art will recognize that other fabrication processes, e.g. the injection molding of plastic, are likewise suitable.

In the preferred embodiment of the present invention two upwardly curved tabs 44 disposed upon the upper rear surface of the subchassis 12 are received by two corresponding slots 40 formed in the main chassis 10 such that the tabs 44 may be inserted therein and the subchassis 12 then pivoted about the tabs 44 into position. Placement of the cover or closure (not shown) upon the main chassis 10 secures the subchassis 12 thereto. The upper surface 15 of the left panel 17 of the subchassis 12 abuts the cover when the cover is disposed upon the main chassis 10. Fasteners, such as screws 94 (shown in FIG. 7), may optionally be used to further secure the subchassis 12 within the chassis 10.

A handle 48 hingeably disposed upon the upper surface at the rear of the subchassis 12 facilitates insertion and removal of the subchassis 12. A handle 58 disposed at the front of the subchassis 2 also aids in the insertion and removal processes.

With particular reference to FIG. 1, when the subchassis 12 is disposed within or attached to the main chassis 10 then tabs 44 of the subchassis are disposed within slots 40 (best shown in FIG. 3), tabs 46 of the subchassis 12 are disposed within slots 42 of the main chassis 10, and tab 66 of the main chassis 10 is disposed within slot 64 of the subchassis 12. The male connector 32 (best shown in FIG. 2) is mated to the female connector 34 (best shown in FIG. 3).

Lateral movement of the rear of the subchassis 14 is prevented by the positioning of the tabs 44 and 46 within their corresponding slots 40 and 42. Longitudinal motion of the subchassis 12 is prevented by the positioning of the tab 66 within the slot 64. Side to side and downward lateral motion of the front of the subchassis 12 is prevented by abutment thereof with the front panel 16 of the main chassis 10. Thus, only the front of the subchassis 10 is free to move and it may only be moved in an upward direction such that the tab 66 of the main chassis 10 and the slot 64 of the subchassis 12 disengage. In order to remove the subchassis 12 from the main chassis 10, it is first necessary to lift the front end of the subchassis 12 to effect the disengagement of the tab 66 from the slot 64 as discussed in further detail infra.

Referring now to FIG. 6, the first or male 32 and second or female 34 elongate pin type electrical connectors further comprise a plurality of pins 82 formed upon the male connector 32 such that they will engage or be received by a corresponding plurality of apertures 84 formed within the female connector 34. Guide post 86 formed upon the male connector 32 are received by bores 88 formed within the female connector 34 to align the male 32 and female 34 connectors such that the pins 82 will be received by their corresponding apertures 84 as the two connectors 32 and 34 are mated. Those skilled in the art will recognize that a variety of electrical connectors are suitable for use in the present invention.

Referring now to FIG. 7, the tab 66 formed upon the main chassis 10 is received by the slot 64 formed at the front of the subchassis 12 when the subchassis 12 is disposed within or attached to the main chassis 10. Fasteners or screws 94 may be received by through holes 68 into threaded apertures 70 (shown in FIG. 3) to further secure the subchassis 12 to the main chassis 10. Handle 58 provides a convenient hand grip such that the front of the subchassis 12 may be lifted to rotate the subchassis 12 upward and away from the main chassis 10 as shown in FIG. 9 and discussed in further detail infra.

Referring now to FIG. 8, the electrical connection of the power supply 60 to connectors 92 of the electrical distribution board 52 is illustrated. Each of the components disposed within or attached to the subchassis 12 may be electrically connected in a similar manner.

A plurality of computer components such as the two 5¼-inch disk drives 26 and 28 and the 3½-inch disk drive 30, as well as the power supply 60 may be disposed within or attached to the subchassis 12. An on/off switch 102 (shown in FIG. 2) is preferably disposed upon the front of the subchassis 12 such that it will be readily accessible when the subchassis 12 is attached to the main chassis 10. Electrical cable 100 electrically interconnects the on/off switch 102 to the power supply 60. Alternatively, the on/off switch 102 could be disposed at a readily accessible location upon the main chassis 10 and electrically interconnected to the power supply 60 via the male 32 and female 34 connectors.

Having thus described the structure of the modular chassis of the present invention, it will be beneficial to describe in detail the processes of attaching and detaching the subchassis 12 from the main chassis 10.

Figure 4:
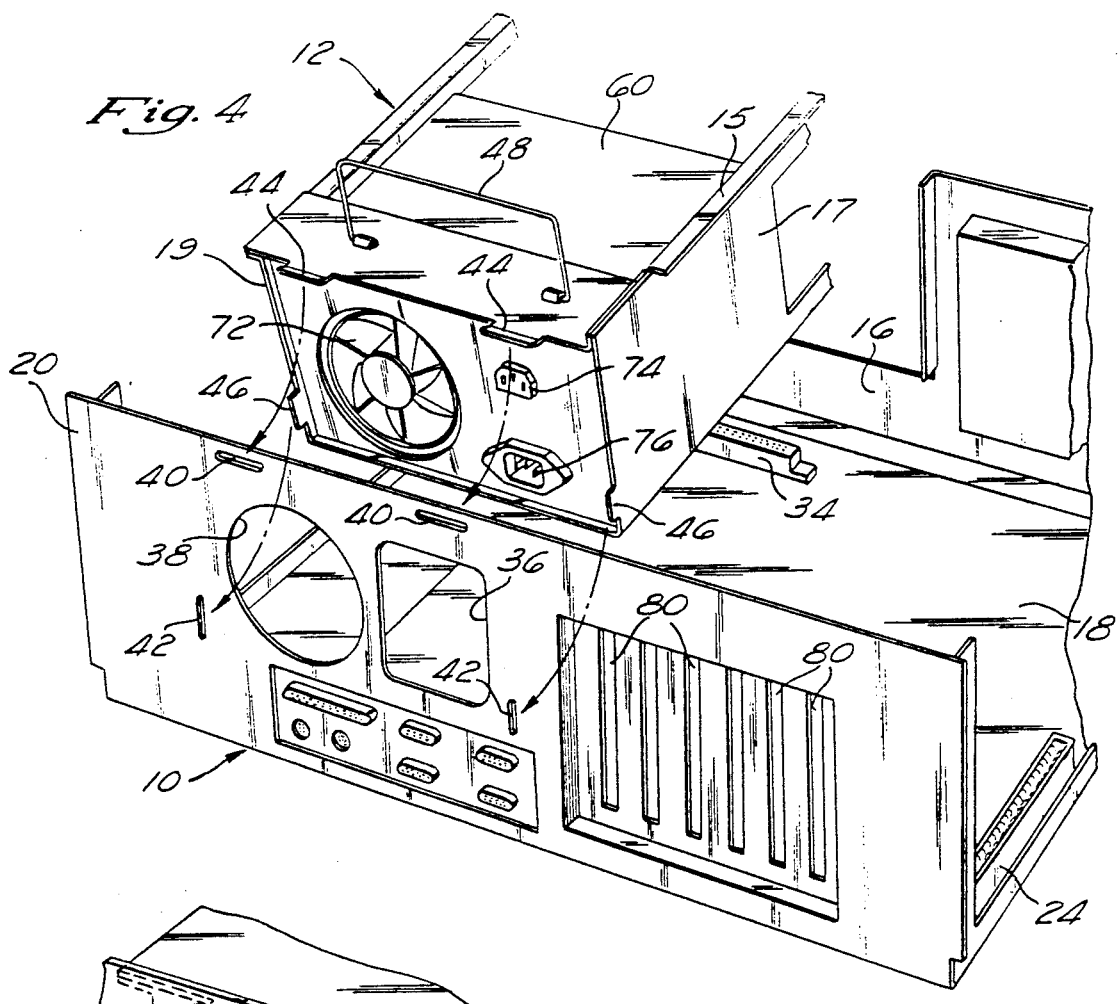
FIG. 4 is an enlarged perspective view of the rear of the main chassis and subchassis of FIG. 1 illustrating the attachment of the subchassis to the main chassis.
Figure 5:
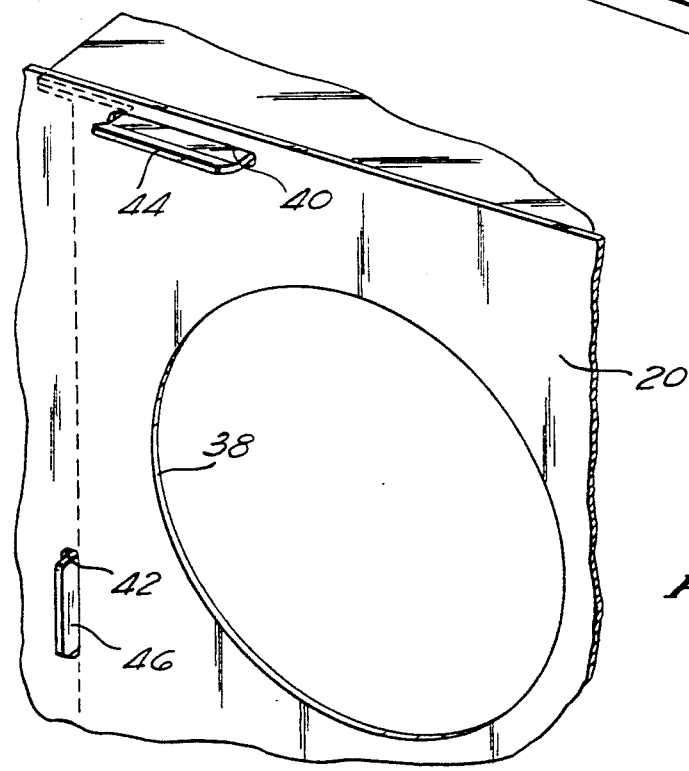
FIG. 5 is an enlarged view of two of the slots and tabs of FIG. 4.

Referring now to FIGS. 4 and 5, the slots 40 and 42 are illustrated receiving the tabs 44 and 46 of the subchassis 12. As can be seen in FIG. 4, the subchassis 12 must be angled downward somewhat such that the upwardly curved tabs 44 formed thereon may engage the slots 40 of the main chassis 10.

Referring now to FIG. 9, after the tabs 44 have engaged the slots 40, the subchassis 12 may be lowered into the main chassis 10 such that the tabs 46 formed upon the rear thereof engage the slots 42 formed in the rear panel 20 of the main chassis and the tab 66 is received by the slot 64 formed in the front of the subchassis 12. The subchassis 12 is held at its rear by grasping hinged handle 48 with one hand and is held at its front by grasping fixed handle 58 with the other hand. Thus, the tabs 44 of the subchassis 12 may be inserted and maintained in place within the slots 40 of the main chassis by manipulating handle 48 with one hand as the other hand lowers the front of the subchassis 12 into place. As can been seen in FIG. 9, when the subchassis is disposed upon or within the main chassis 10, the male connector 32 mates with the female connector 34, thus establishing an electrical interconnection therebetween. Screws 94 (as shown in FIG. 7) may optionally be used to positively secure the subchassis 12 to the main chassis 10.

Removal of the subchassis 12 from the main chassis 10 is the reverse of installation. The screws 94, if used, are removed, then the subchassis 12 is lifted by the front handle 58 to pivot the subchassis 12 about the upwardly curved tabs 44. The hinged handle 48 can then be used in cooperation with the front handle 58 to lift the subchassis 12 away from the main chassis 10.

It is understood that the exemplary modular chassis described herein and shown in the drawings represents only a presently preferred embodiment of the invention. Indeed, various modifications and additions may be made from such embodiment without departing from the spirit and the scope of the invention. Other computer components commonly requiring maintenance or removal and replacement may also be located upon the subchassis 12. For example, a battery for a realtime clock may disposed thereupon. Furthermore, provision may be made upon the subchassis 12 for additional RAM memory. Furthermore, one or more card slots such as 24 attached to the motherboard 22 may be formed upon the subchassis 14 such that those cards commonly requiring maintenance may be disposed therein. Thus, these and other modifications and additions may be obvious to those skilled in the art may be implemented to adapt the present invention for use in a variety of different applications.

What is claimed is:

1. A modular computer comprising:
   (a) a main chassis;
   (b) a motherboard disposed upon said main chassis;
   (c) a subchassis removably attached to said main chassis;
   (d) at least one failure-prone component disposed upon said subchassis;
   (e) a first electrical connector disposed upon said main chassis in electrical communication with said motherboard;
   (f) a complimentary second electrical connector disposed upon said subchassis in electrical communication with said at least one failure-prone component;
   (g) wherein said first and second connectors mate when said subchassis is attached to said main chassis such that electrical communication is provided between said motherboard and said at least one failure-prone component; and
   (h) wherein easy removal and replacement of said failure-prone component is facilitated by detachment of said subchassis from said main chassis.

2. The modular computer as recited in claim 1 wherein said at least one failure-prone component comprises at least one of a power supply and a disk drive.

3. The modular computer as recited in claim 1 further comprising a cover disposable over a substantial portion of said main chassis, said subchassis being secured to said main chassis by said cover when said cover is disposed over said main chassis.

4. The modular computer as recited in claim 1 wherein:
   (a) said at least one failure-prone component comprises a power supply; and
   (b) further comprising a switch disposed upon said subchassis for turning the modular computer on and off.

5. A modular computer comprising:
   (a) a main chassis;
   (b) a motherboard disposed upon said main chassis;
   (c) a subchassis removably attached to said man chassis;
   (d) a power supply and at least one disk drive disposed upon said subchassis;
   (e) a first electrical connector disposed upon said main chassis in electrical communication with said motherboard;
   (f) a complimentary second electrical connector disposed upon said subchassis in electrical connection with said power supply and said at least one disk drive;
   (g) wherein said first and second connectors mate when said subchassis is attached to said main chassis such that electrical communication is provided between said motherboard disposed upon said main chassis and said power supply and said at least one disk drive disposed upon said subchassis; and
   (h) wherein easy removal and replacement of said power supply and said at least one disk drive is facilitated by detachment of said subchassis from said main chassis.

6. The modular computer as recited in claim 5 wherein said at least one disk drive comprises two 5¼ inch disk drives.

7. The modular computer as recited in claim 6 further comprising a tape drive disposed upon said subchassis.

8. The modular computer as recited in claim 5 wherein said at least one disk drive comprises two 5¼ inch disk drives and one 3½ inch disk drive.

* * * * *